United States Patent
Ohkanda et al.

(10) Patent No.: US 10,756,557 B2
(45) Date of Patent: Aug. 25, 2020

(54) CHARGE APPARATUS TO REPEATEDLY APPLY A PULSED HIGH VOLTAGE AND A LOW VOLTAGE TO CHARGE A BATTERY

(71) Applicant: FUJI ELECTRIC CO., LTD., Kanagawa (JP)

(72) Inventors: Takaharu Ohkanda, Ichihara (JP); Kazuyuki Yoda, Kobe (JP); Hiroshi Takano, Ichihara (JP); Ryuta Nishizuka, Hachioji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/364,151

(22) Filed: Nov. 29, 2016

(65) Prior Publication Data

US 2017/0155277 A1    Jun. 1, 2017

(30) Foreign Application Priority Data

Dec. 1, 2015 (JP) .................. 2015-235100

(51) Int. Cl.
*H02J 7/00* (2006.01)
*H02J 9/06* (2006.01)

(52) U.S. Cl.
CPC ......... *H02J 7/00711* (2020.01); *H02J 7/0068* (2013.01); *H02J 9/061* (2013.01)

(58) Field of Classification Search
CPC ........ H02J 9/061; H02J 7/0068; H02J 7/0093; H02J 2007/105; H02J 7/00711
(Continued)

(56) References Cited

U.S. PATENT DOCUMENTS 5,442,274 A * 8/1995 Tamai .................. H02J 7/0093
                                                           320/146
5,998,968 A * 12/1999 Pittman ................ H02J 7/0093
                                                           320/130
(Continued)

FOREIGN PATENT DOCUMENTS

CN     101388560 A    3/2009
CN     103227351 A    7/2013
(Continued)

OTHER PUBLICATIONS

Office Action issued for counterpart Japanese Application 2015-235100, issued by the Japan Patent Office dated Mar. 8, 2016.
(Continued)

*Primary Examiner* — Richard Isla
*Assistant Examiner* — Manuel Hernandez

(57) ABSTRACT

With a conventional pulse charging method, a low voltage value for the pulse voltage is set to zero volts. When the low voltage value is low in this manner during charging, there is a problem that the negative pole of a secondary battery deteriorates. Provided is a secondary battery apparatus including a secondary battery and charge/discharge control apparatus that controls charging and discharging of the secondary battery. The charge/discharge control apparatus repeatedly performs, in an alternating manner, high voltage charging of applying a pulsed high voltage to the secondary battery and low voltage charging of applying a low voltage that is higher than 0 V and lower than the high voltage to the secondary battery.

18 Claims, 13 Drawing Sheets

(58) Field of Classification Search
USPC .......................................................... 320/139
See application file for complete search history.

(56) References Cited

U.S. PATENT DOCUMENTS

| 10,067,198 B2* | 9/2018 | Maluf ................... H02J 7/0047 |
| 10,389,156 B2* | 8/2019 | Berkowitz ............ H02J 7/0093 |
| 2008/0186302 A1* | 8/2008 | Chang ................... H02J 7/0052 |
| | | 345/212 |
| 2009/0085526 A1* | 4/2009 | Smith ................... H02J 7/0093 |
| | | 320/139 |
| 2017/0054184 A1 | 2/2017 | Tanabe |

FOREIGN PATENT DOCUMENTS

| JP | H07-336908 A | 12/1995 |
| JP | H09-117075 A | 5/1997 |
| JP | H10-304589 A | 11/1998 |
| JP | 2010-279173 A | 12/2010 |
| JP | 2012029538 A | 2/2012 |
| JP | 2013-012412 A | 1/2013 |
| JP | 3182284 U | 3/2013 |
| JP | 2013-255369 A | 12/2013 |
| JP | 2014-236525 A | 12/2014 |
| WO | 2015162877 A1 | 10/2015 |

OTHER PUBLICATIONS

International Search Report for International Patent Application No. PCT/JP2016/084326 issued by the Japan Patent Office dated Jan. 24, 2017.
Office Action issued for counterpart Chinese Application 201611075260, issued by the Chinese Intellectual Property Office dated Nov. 3, 2017.
Office Action issued for counterpart Indian Application No. 201817007223, issued by the India Intellectual Property Office dated Nov. 5, 2019.

* cited by examiner

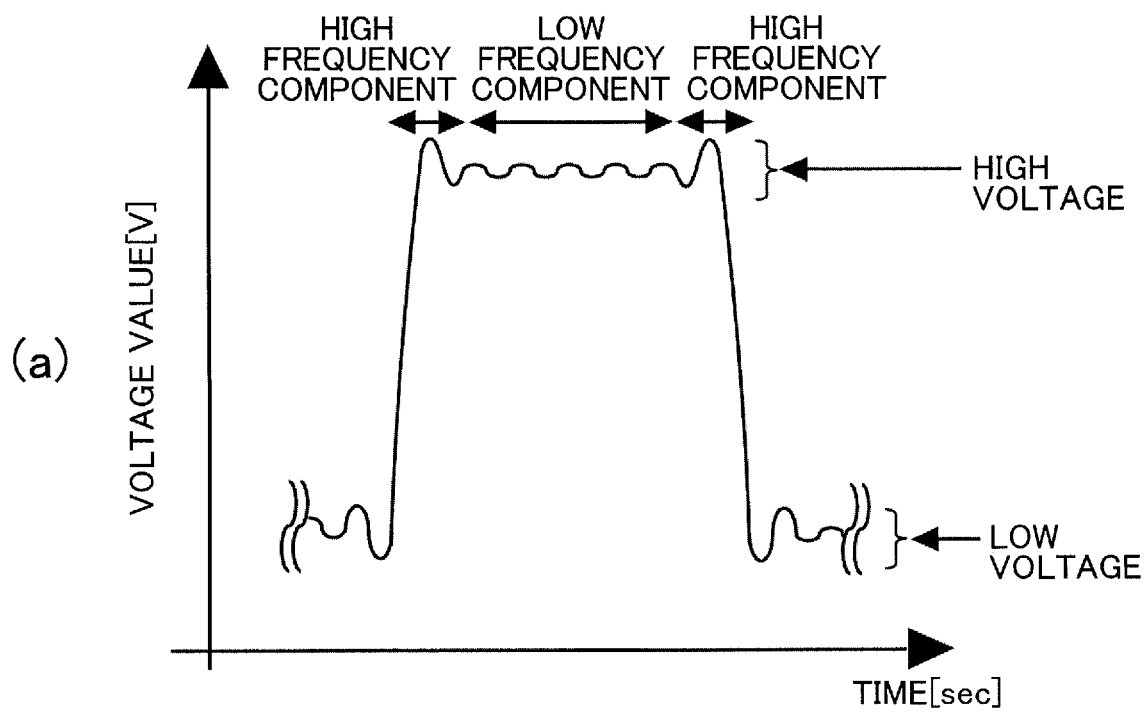
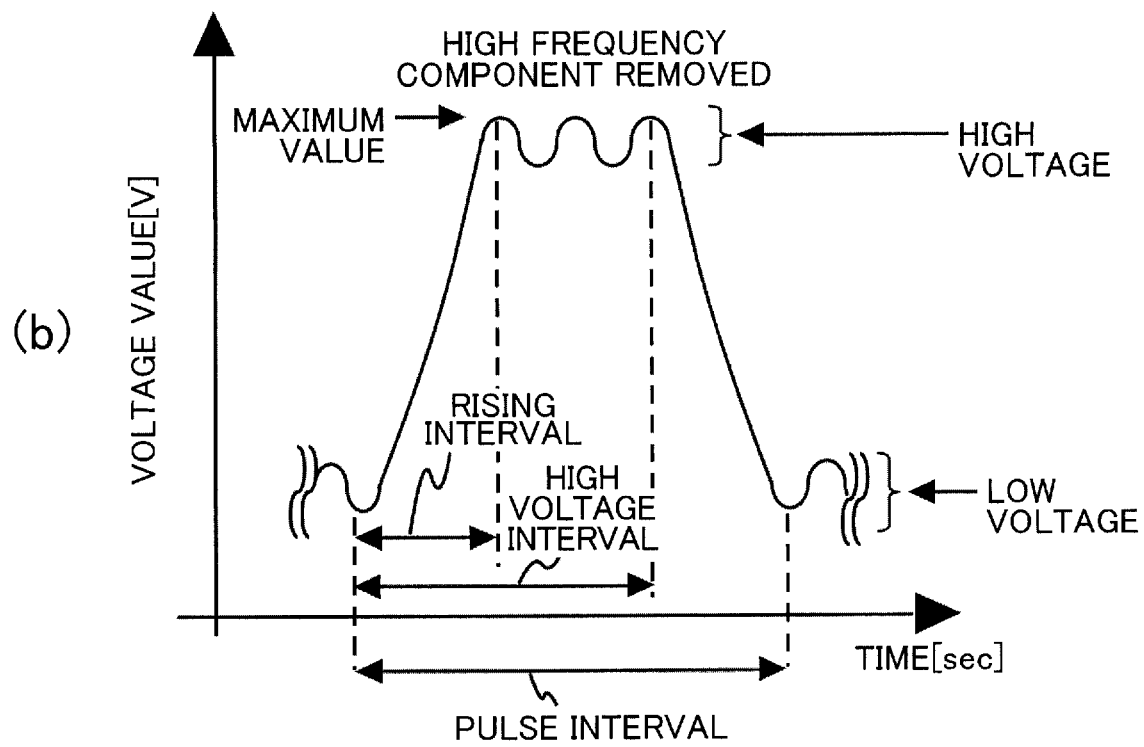
FIG. 13

CHARGE APPARATUS TO REPEATEDLY APPLY A PULSED HIGH VOLTAGE AND A LOW VOLTAGE TO CHARGE A BATTERY

The contents of the following Japanese patent application are incorporated herein by reference: NO. 2015-235100 filed in JP on Dec. 1, 2015.

BACKGROUND

1. Technical Field

The present invention relates to a lead battery, an uninterruptable power supply, a power supply system, a charge/discharge control apparatus, and a charge/discharge control method.

2. Related Art

Conventionally, a secondary battery is known that is charged using a pulse charging method (see Patent Document 1 and Utility Model Registration 1). Furthermore, a current control section is provided to limit the current flowing through a capacitor and prioritize charging of a lead battery while control is performed (see Patent Document 2).
Patent Document 1: Japanese Patent Application Publication No. H10-304589
Patent Document 2: Japanese Patent Application Publication No. 2010-279173
Utility Model Registration 1: Utility Model Registration No. 3182284

With a conventional pulse charging method, a low voltage value for the pulse voltage is set to zero volts. When the low voltage value is low in this manner during charging, there is a problem that the negative pole of the secondary battery deteriorates.

SUMMARY

A secondary battery apparatus may comprise a secondary battery and a charge/discharge control apparatus. The charge/discharge control apparatus may control charging and discharging of the secondary battery. The charge/discharge control apparatus may repeatedly perform, in an alternating manner, high voltage charging and low voltage charging. The high voltage charging may include applying a pulsed high voltage to the secondary battery. The low voltage charging may include applying a low voltage that is higher than 0 V and lower than the high voltage to the secondary battery.

The low voltage of the low voltage charging may be greater than or equal to the electromotive force of the secondary battery when fully charged.

The low voltage of the low voltage charging may be less than or equal to the electromotive force of the secondary battery when fully charged.

The low voltage of the low voltage charging may be greater than or equal to 74% of a theoretical electromotive force of the secondary battery.

The low voltage of the low voltage charging may be greater than or equal to 93% of the theoretical electromotive force of the secondary battery.

The low voltage of the low voltage charging may be greater than or equal to 121% of a voltage value of the theoretical electromotive force of the secondary battery.

A low voltage charging time $T_L$ during which the low voltage is applied to the secondary battery may be longer than a high voltage charging time $T_H$ during which the high voltage is applied to the secondary battery.

A ratio between the low voltage charging time $T_L$ and the high voltage charging time $T_H$ may be such that $4 \leq T_L/T_H$.

The charge/discharge control apparatus may detect a charging current supplied to the secondary battery. The charge/discharge control apparatus may control a voltage value of the low voltage such that the charging current is greater than or equal to zero during the low voltage charging.

The charge/discharge control apparatus may detect the electromotive force of the secondary battery and control the voltage value of the low voltage, based on the detected electromotive force.

The charge/discharge control apparatus may control the high voltage charging time $T_H$ during which the high voltage is applied to the secondary battery, based on a usage time of the secondary battery.

The charge/discharge control apparatus may control the high voltage charging time $T_H$ during which the high voltage is applied to the secondary battery, based on an internal resistance of the secondary battery.

The charge/discharge control apparatus may control the low voltage charging time $T_L$ during which the low voltage is applied to the secondary battery, based on a usage time of the secondary battery.

The charge/discharge control apparatus may control the low voltage charging time $T_L$ during which the low voltage is applied to the secondary battery, based on an internal resistance of the secondary battery.

The secondary battery apparatus may further comprise a capacitor element. The capacitor element may be connected in parallel with the secondary battery. The capacitor element may have an electrostatic capacitance.

The charge/discharge control apparatus may apply the high voltage that is a pulse obtained by removing a predetermined high frequency component from a square wave to the secondary battery, during the high voltage charging.

A power supply system may include a power supply apparatus and the secondary battery described above. The charge/discharge control apparatus of the secondary battery may charge the secondary battery with power generated by the power supply apparatus.

A charge/discharge control apparatus that controls charging and discharging of a secondary battery may repeatedly perform, in an alternating manner, high voltage charging and low voltage charging. The high voltage charging may include applying a pulsed high voltage to the secondary battery. The low voltage charging may include applying a low voltage that is higher than 0 V and lower than the high voltage to the secondary battery.

A charging/discharging control method for controlling charging and discharging of a secondary battery may comprise repeatedly performing, in an alternating manner, high voltage charging and low voltage charging. The high voltage charging may include applying a pulsed high voltage to the secondary battery. The low voltage charging may include applying a low voltage that is higher than 0 V and lower than the high voltage to the secondary battery.

The summary clause does not necessarily describe all necessary features of the embodiments of the present invention. The present invention may also be a sub-combination of the features described above.

BRIEF DESCRIPTION OF THE DRAWINGS

FIG. 13 shows a graph (a) of a pulse waveform including a high frequency component and a low frequency component and a graph (b) of a pulse waveform obtained by removing the high frequency component.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
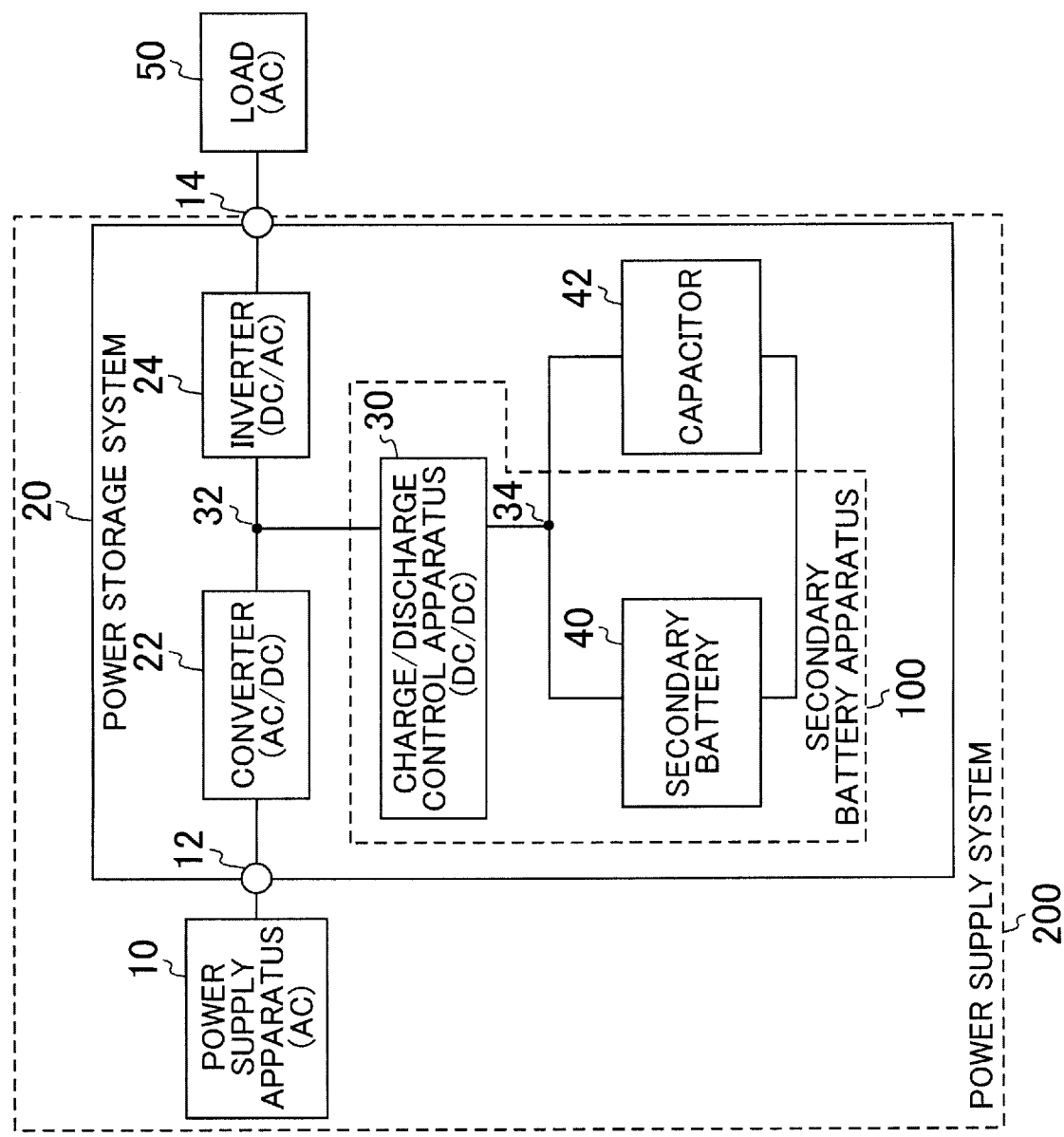
FIG. 1 shows a power supply system 200 according to a first embodiment.

FIG. 1 shows a power supply system 200 according to a first embodiment. The power supply system 200 in this example includes a power supply apparatus 10 and a power storage system 20. The power supply apparatus 10 in this example is connected to an input terminal 12 of the power storage system 20. A load 50 may be connected to an output terminal 14 of the power storage system 20. The power supply apparatus 10 may be an AC power supply, and the load 50 may be a load that is driven by AC power. The power storage system 20 may be used in an uninterruptible power supply (UPS) or a power generating apparatus such as a solar power generating apparatus or a wind power generating apparatus.

The power storage system 20 includes a converter 22, an inverter 24, a secondary battery apparatus 100, and a capacitor 42. The secondary battery apparatus 100 includes a charge/discharge control apparatus 30 and a secondary battery 40.

The converter 22 converts the alternating current output from the power supply apparatus 10 into direct current. The converter 22 outputs the direct current resulting from the conversion to the charge/discharge control apparatus 30. The inverter 24 converts the direct current output from the charge/discharge control apparatus 30 into alternating current. The inverter 24 outputs the alternating current resulting from the conversion to the load 50. If the load 50 operates using direct current, the inverter 24 may be omitted. Furthermore, if the power supply apparatus 10 supplies direct current, the converter 22 may be omitted.

During normal operation, the power supply system 200 may supply the load 50 with the power from the power supply apparatus 10 via the converter 22 and the inverter 24. Furthermore, during normal operation, the charge/discharge control apparatus 30 may charge the secondary battery 40 with the power generated by the power supply apparatus 10. During abnormal operation, the power storage system 20 may supply the load 50 with the power accumulated in the secondary battery 40.

For example, when the power storage system 20 is used in an uninterruptible power supply (UPS), during normal operation, power is supplied to the load 50 from the power supply apparatus 10 via the converter 22 and the inverter 24. In contrast to this, during abnormal operation, such as when there is a power outage, the power is supplied to the load 50 from the secondary battery 40 via the charge/discharge control apparatus 30 and the inverter 24.

As another example, when the power storage system 20 is used in a power generating apparatus, the power supply apparatus 10 is a power generator. When the power generator operates, power is supplied to the load 50 from the power generator via the converter 22 and the inverter 24. In contrast to this, when the generated power becomes unstable due to weather conditions or the like, the power is supplied to the load 50 from the secondary battery 40 via the charge/discharge control apparatus 30 and the inverter 24.

One end of the charge/discharge control apparatus 30 is connected to a node 32 between the converter 22 and the inverter 24. The other end of the charge/discharge control apparatus 30 is electrically connected to the secondary battery 40 via a node 34. The charge/discharge control apparatus 30 controls the charging and discharging of the secondary battery 40. The charge/discharge control apparatus 30 in this example performs intermittent charging of the secondary battery 40. Intermittent charging refers to a charging method that includes repeatedly performing charging using high voltage charging and low voltage charging in an alternating manner.

The secondary battery 40 may be a secondary battery using an aqueous electrolytic solution. The secondary battery using an aqueous electrolytic solution may be a lead battery, which may also be referred to as a lead acid battery or a lead storage battery, a nickel cadmium battery, or a nickel hydrogen battery. The secondary battery 40 in this example is a lead battery. The lead battery in this example is a unit including six cells connected in series. A cell is the smallest unit of a lead battery and has a positive pole and a negative pole.

The other end of the charge/discharge control apparatus 30 is electrically connected to the capacitor 42 as well, via the node 34. The capacitor 42 is a capacitor element that has an electrostatic capacitance. The capacitor 42 in this example is an electric double-layer capacitor (EDLC). The capacitor 42 is connected in parallel with the secondary battery 40. The capacitor 42 is charged together with the secondary battery 40 when the high voltage charging is performed during the intermittent charging. The capacitor 42 may have a function to supply the secondary battery 40 with the power accumulated from the intermittent charging when low voltage charging is performed.

Figure 2:
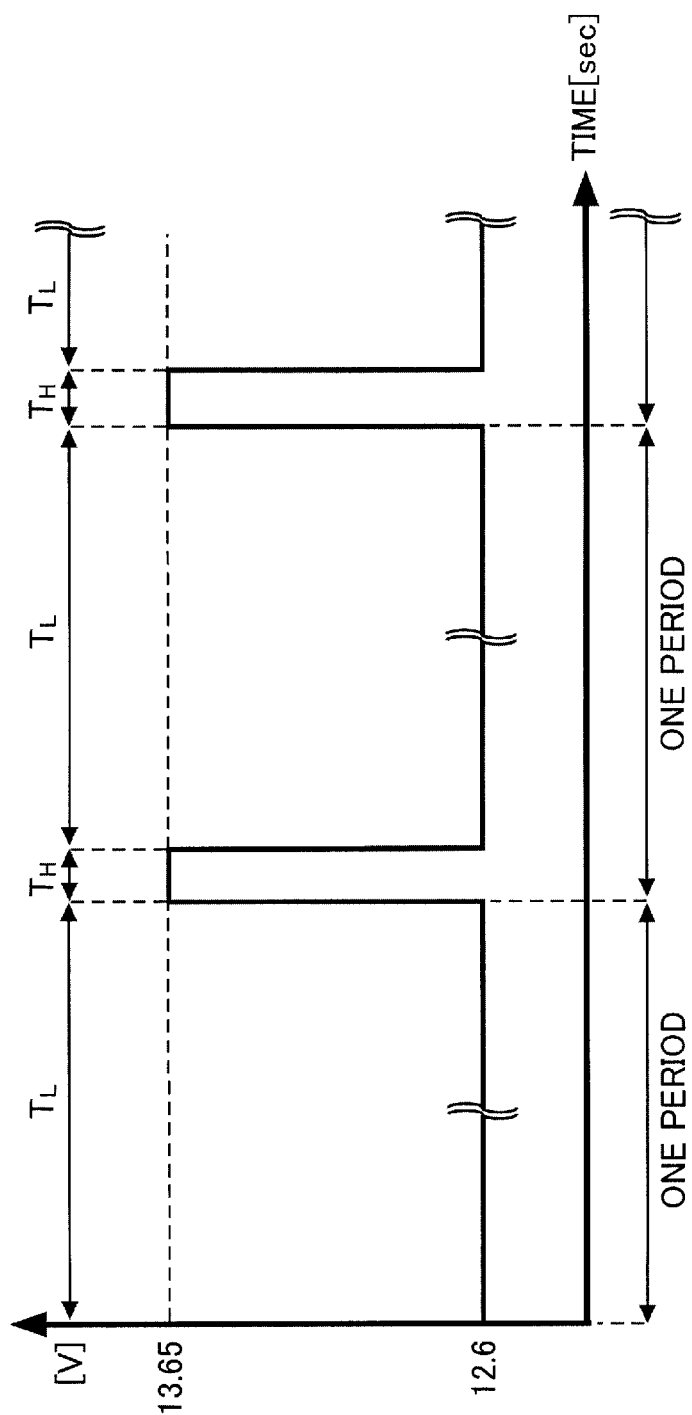
FIG. 2 shows a timing chart of the voltage value during the intermittent charging.

FIG. 2 shows a timing chart of the voltage value during the intermittent charging. The horizontal axis indicates time [sec] and the vertical axis indicates the voltage [V]. In the drawing, $T_H$ indicates the high voltage charging time during which the high voltage is applied to the secondary battery 40 and $T_L$ indicates the low voltage charging time during which the low voltage is applied to the secondary battery 40. In the intermittent charging of this example, one period that includes $T_H$ when the high voltage is applied and $T_L$ when the low voltage is applied is repeated at least once.

During the high voltage charging, the charge/discharge control apparatus 30 applies a pulsed high voltage to the secondary battery 40. The pulsed high voltage in this example refers to a voltage waveform with a voltage value that increases sharply in a short time. The pulsed high voltage may have a sinusoidal waveform, a square waveform, a triangular waveform, or a saw-tooth waveform having a peak every half period. The pulsed high voltage in this example has a square waveform with a prescribed peak voltage value.

The high voltage value may be a specification value designated by the battery manufacturer. In this example, the specification value is 13.65 [V]. The secondary battery 40 in this example is a lead battery. The lead battery in this example has six cells connected in series. Therefore, during $T_H$, a voltage of 2.275 [V](=13.65 [V]/6) is applied to each cell. The high voltage value may be changed according to the specifications of the secondary battery 40.

The time $T_H$ in this example is 60 [sec]. In this example, the high voltage is applied as a pulse, and therefore the high voltage charging time can be made shorter than in a case where trickle charging is performed constantly with a high voltage. When $T_H$ is shorter, the loss of the water acting as the electrolyte medium from the secondary battery, which is due to the electrolysis of the water causing the water to decompose into hydrogen and oxygen, can be restricted. Therefore, this example in which $T_H$ is short is beneficial for any secondary battery 40 that uses an aqueous electrolytic solution.

Furthermore, this example where $T_H$ is short can also be beneficial for stopping decay of the positive pole of the secondary battery 40. In a case where the secondary battery 40 is a lead battery, having a short time $T_H$ is particularly useful for stopping deformation of the positive pole and decay of the positive pole. Specifically, having a short time $T_H$ is particularly useful for stopping the formation of lead oxide in on the positive pole and stopping an increase in the volume caused by this lead oxide. Furthermore, in a case where the secondary battery 40 is a lead battery, it is possible to periodically dissolve the sulfation generated on the negative pole by using the pulsed high voltage.

In a lead battery, the half reaction described below occurs during charging. The lead oxide that causes a problem during charging is the $PbO_2$ in the positive pole reaction.

(Positive Pole Reaction) $PbSO_4 + 2H_2O \rightarrow PbO_2 + 4H^+ + SO_4^{2-} + 2e^-$ (Negative Pole Reaction) $PbSO_4 + 2e^- \rightarrow Pb + SO_4^{2-}$ During discharge, the half reaction described below, which is the opposite of the half reaction occurring during charging, occurs. The sulfation that is a problem during discharge is the $PbSO_4$ occurring in the negative pole reaction.

(Positive Pole Reaction) $PbO_2 + 4H^+ + SO_4^{2-} + 2e^- \rightarrow PbSO_4 + 2H_2O$ (Negative Pole Reaction) $Pb + SO_4^{2-} \rightarrow PbSO_4 + 2e^-$ During the low voltage charging, the charge/discharge control apparatus 30 may apply a low voltage that restricts deterioration of the negative pole of the secondary battery 40 to the secondary battery 40. This low voltage may be higher than 0 [V] and may be lower than the high voltage. This low voltage may be greater than or equal to the electromotive force at the time when the secondary battery 40 is fully discharged. In an example where a lead battery is used, when the electromotive force for one cell is 1.95 [V] at the time when the cell is fully discharged, the low voltage may be greater than or equal to 11.7 [V](=1.95 [V]×6). The value of the electromotive force at the time when the battery is fully discharged may obviously be changed according to the capabilities of each battery.

In an example where a nickel cadmium battery or a nickel hydrogen battery is used, the negative pole deteriorates due to the reaction between the negative pole and water during discharge. In an example where a lead battery is used, when the charging voltage is extremely low, self discharge occurs and sulfation is generated at the negative pole. For example, when the charging voltage is 0 [V], the crystallized sulfation hardens on the negative pole. It is difficult for the hardened sulfation to return to an electrolytic solution even when charging is performed. Therefore, the negative pole deteriorates significantly. To avoid this, in this example, the low voltage is set to be higher than 0 [V]. Furthermore, the low voltage is set to be greater than or equal to the electromotive force at the time when the battery is fully discharged. As a result, it is possible to prevent deterioration of the negative pole of the secondary battery 40.

The low voltage may be greater than or equal to 74% of the theoretical electromotive force of the secondary battery 40. In an example where a lead battery is used, when the theoretical electromotive force of one cell is 2.04 [V], the low voltage may be greater than or equal to approximately 9.06 [V](=2.04 [V]×0.74×6). As another example, the low voltage may be greater than or equal to 93% of the theoretical electromotive force of the secondary battery 40. In an example where a lead battery is used, when the theoretical electromotive force of one cell is 2.04 [V], the low voltage may be greater than or equal to approximately 11.4 [V] (=2.04 [V]×0.93×6).

In this example, the low voltage being greater than or equal to 74% or 93% of the theoretical electromotive force means that the temporary lowest value of the low voltage is greater than or equal to 74% or 93% of the theoretical electromotive force. Therefore, in the lead battery of this example, even when the low voltage is greater than or equal to 74% or 93% of the theoretical electromotive force, the effect of restricting the sulfation is achieved to a certain extent.

Furthermore, the low voltage may be less than or equal to the electromotive force at the time when the secondary battery 40 is fully charged. In an example where a lead battery is used, when the electromotive force of one cell is 2.1 [V] at the time when the cell is fully charged, the low voltage may be less than or equal to 12.6 [V](=2.1 [V]×6). The value of the electromotive force at the time when the secondary battery 40 is fully charged may obviously be changed according to the capabilities of each battery.

The low voltage may be less than or equal to 121% of the voltage value of the theoretical electromotive force of the secondary battery 40. In an example where a lead battery is used, when the theoretical electromotive force of one cell is 2.04 [V] per cell, the low voltage may be less than or equal to approximately 14.8 [V](=2.04 [V]×1.21×6).

In this example, the low voltage is 12.6 [V]. In other words, during $T_L$ in this example, a voltage of 2.1 [V](=12.6 [V]/6) is applied to each cell.

The time $T_L$ may be longer than the time $T_H$. In this example, $T_L$ is 3,600 [sec](=1 hour), and $T_H$ is 60 [sec]. Furthermore, with $T_H$ being 60 [sec], $T_L$ may be greater than or equal to 240 [sec], greater than or equal to 30 [min], or greater than or equal to 1 [hour]. In other words, the ratio between $T_L$ and $T_H$ may be such that $4 \leq T_L/T_H$, $30 \leq T_L/T_H$, or $60 \leq T_L/T_H$.

With $T_H$ being 60 [sec], $T_L$ may be less than or equal to 3 [hours] or less than or equal to 5 [hours]. In other words, the ratio between $T_L$ and $T_H$ may be such that $T_L/T_H \leq 180$ or $T_L/T_H \leq 300$. In particular, the inventor of the present invention confirmed through experimentation that, with a lead battery, deterioration of the negative pole progresses rapidly when $T_L$ is greater than or equal to 3 hours and less than or equal to 5 hours. Therefore, it is particularly effective to set $T_L$ to be less than or equal to 5 hours, more preferably less than or equal to 3 hours, in order to protect the lead battery.

Figure 3:
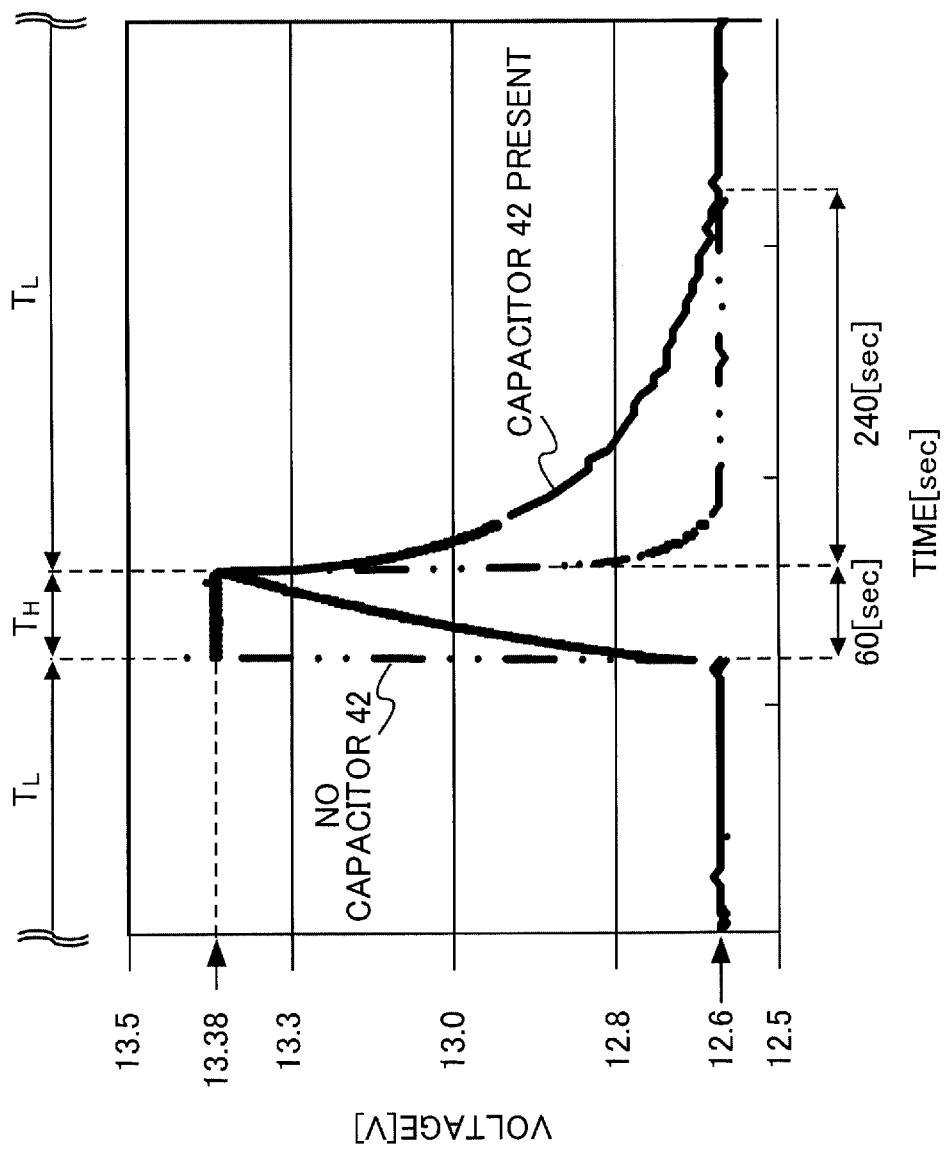
FIG. 3 shows the change over time of the voltage of the secondary battery 40.

FIG. 3 shows the change over time of the voltage of the secondary battery 40. The horizontal axis indicates time [sec] and the vertical axis indicates the voltage [V]. In the example of FIG. 3, the voltage waveform shown in FIG. 2 is input to the secondary battery 40 from the charge/discharge control apparatus 30. In this example, the secondary battery 40 is a lead battery.

The terminal voltage of the secondary battery 40 in a case where the secondary battery 40 is connected in parallel with the capacitor 42 is shown by a solid line. This is shown in FIG. 3 as "capacitor 42 present." In contrast to this, the terminal voltage of the secondary battery 40 in a case where the capacitor 42 is not connected in parallel with the secondary battery 40 is indicated by a double-dashed chain line. This is shown in FIG. 3 as "no capacitor 42." In the example of "no capacitor 42," the capacitor 42 is not present in the power storage system 20.

The secondary battery 40 in this example is a commercially available lead battery in which six cells are connected in series. The low voltage charging time $T_L$ is set to 3,600 [sec] and the high voltage charging time $T_H$ is set to 60 [sec]. Furthermore, the low voltage during $T_L$ is set to 12.6 [V] and the high voltage during $T_H$ is set to 13.38 [V].

In the "no capacitor 42" case, after the transition from $T_L$ to $T_H$, the terminal voltage rises to the high voltage almost immediately. Then, when $T_H$ ends, the terminal voltage drops quickly to the low voltage over a span of tens of seconds.

In contrast to this, in the "capacitor 42 present" case, after the transition from $T_L$ to $T_H$, the terminal voltage rises from the low voltage to the high voltage from when $T_H$ begins to when $T_H$ ends. In other words, compared to the "no capacitor 42 case," the terminal voltage rises gradually. When $T_H$ ends, the terminal voltage drops to the low voltage during a span of 240 [sec] from when $T_L$ begins. In other words, compared to the "no capacitor 42" case, the voltage value drops gradually.

The charging of the secondary battery 40 progresses due to a chemical reaction. Therefore, even when charging is achieved quickly in a short time, there are cases where the chemical reaction does not progress and ohmic heat loss occurs. Furthermore, if $T_H$ is significantly long, overcharging occurs and causes the dissolution of the electrolyte solution and the decay and deformation of the positive pole to progress. Therefore, as shown in this example, the secondary battery 40 and the capacitor 42 are connected in parallel, the secondary battery 40 and the capacitor 42 are charged during $T_H$, and the secondary battery 40 is charged with the power accumulated in the capacitor 42 during $T_L$. In this way, it is possible to simultaneously solve the problem of the chemical reaction time and the problem of over-charging.

Figure 4:
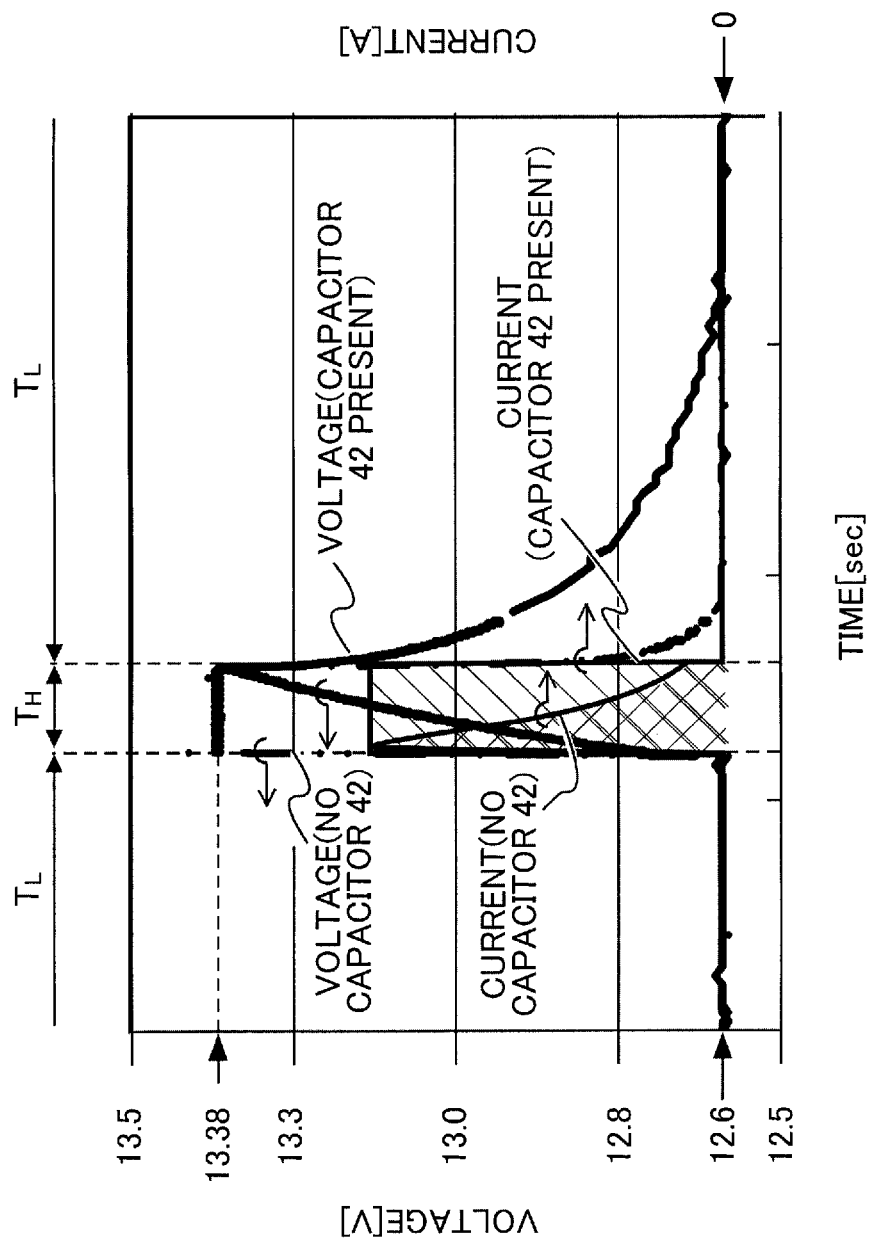
FIG. 4 shows the change over time of the voltage and current of the secondary battery 40.

FIG. 4 shows the change over time of the voltage and current of the secondary battery 40. FIG. 4 shows the qualitative behavior of the charging current [A] superimposed on FIG. 3. The horizontal axis indicates time [sec], the vertical axis on the left side indicates the voltage [V], and the vertical axis on the right side indicates the current [A].

In the "no capacitor 42" case, the current flowing through the secondary battery 40 increases suddenly from 0 [A] to a prescribed current value when $T_H$ begins. The current then gradually decreases during $T_H$, and drops suddenly to 0 [A] when $T_H$ ends. The amount of charge (=current×time) accumulated in the secondary battery 40 during $T_H$ is shown by intersecting diagonal lines, i.e. a mesh pattern.

In contrast to this, in the "capacitor 42 present" case, the current flowing through the secondary battery 40 increases suddenly from 0 [A] to a prescribed current value when $T_H$ begins, and then stays at a constant current during $T_H$. The current then drops suddenly to 0 [A] when $T_H$ ends. In other words, during $T_H$, the secondary battery 40 is charged with a constant current. The amount of charge (=current×time) accumulated in the secondary battery 40 during $T_H$ is shown by diagonal lines.

When the secondary battery 40 and the capacitor 42 are connected in parallel, a parallel circuit is formed in which the internal resistance of the secondary battery 40 and the internal resistance of the capacitor 42 are in parallel. Connecting the secondary battery 40 and the capacitor 42 in parallel results in a lower total internal resistance than in a case where the secondary battery 40 alone is used. Therefore, connecting the secondary battery 40 and the capacitor 42 in parallel causes the speed of the voltage increase during charging to be slower than when the secondary battery 40 alone is used. As a result, connecting the secondary battery 40 and the capacitor 42 in parallel increases the charging time with the constant current, and therefore increases the charging amount. Therefore, the total charge flowing through the secondary battery 40 in the "capacitor 42 present" case is greater than in the "no capacitor 42" case. In other words, with the intermittent charging of this example, it is possible to charge the secondary battery 40 more efficiently in the "capacitor 42 present" case than in the "no capacitor 42" case. In $T_L$ immediately after $T_H$ has passed, the capacitor 42 can charge the secondary battery 40 in accordance with the decrease in the voltage of the secondary battery 40. However, it should be noted that the charging current of the secondary battery 40 flows only during $T_H$ and does not flow during $T_L$ immediately after $T_H$ has passed.

Figure 5:
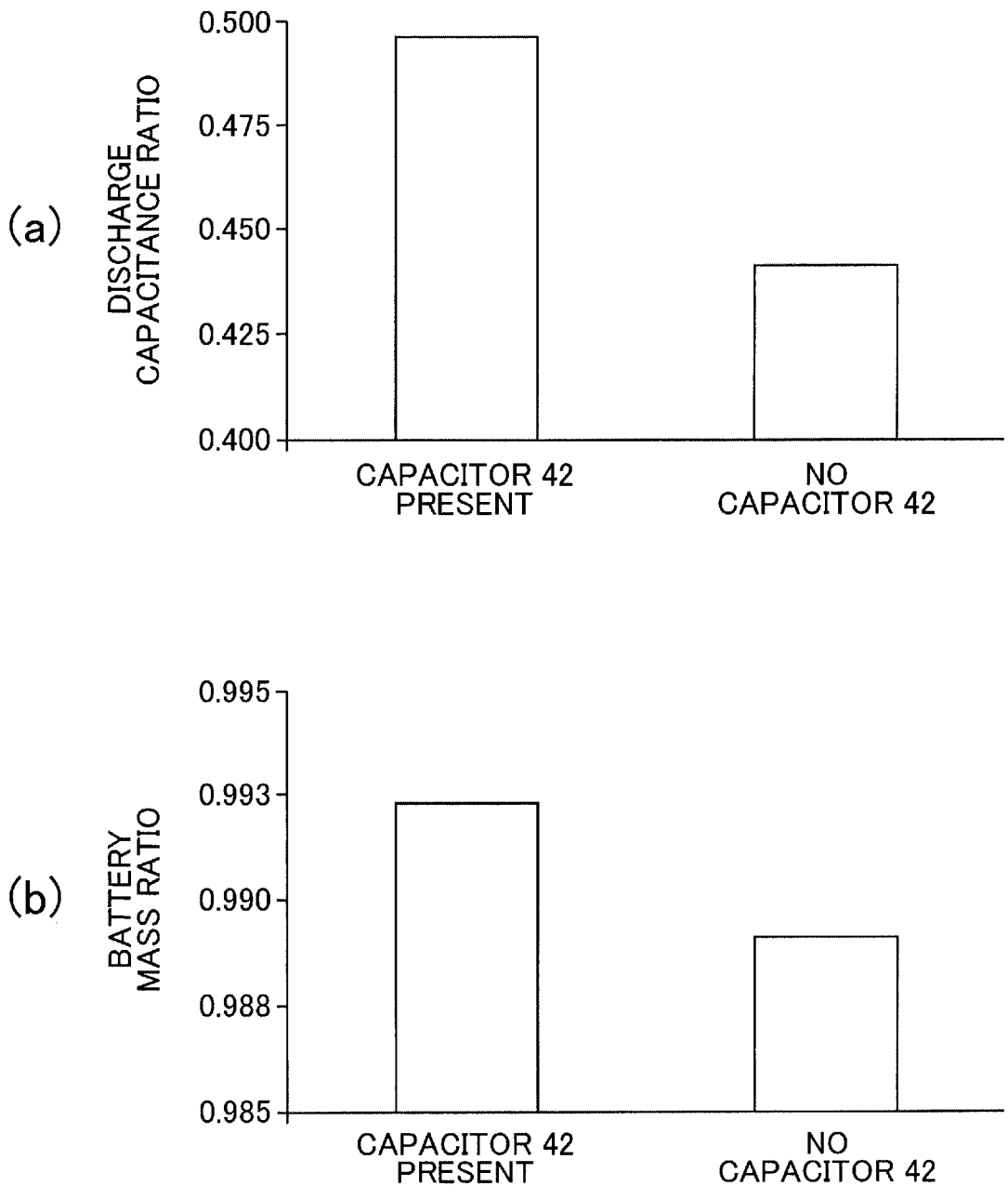
FIG. 5 shows (a) a discharge capacitance ratio and (b) a battery mass ratio in a charging and discharging experiment.

FIG. 5 shows (a) a discharge capacitance ratio and (b) a battery mass ratio in a charging and discharging experiment. In this example, one period was set to be 30 days, and the secondary battery 40 was intermittently charged as described above during this one period. After this, the charging was stopped every period. After the stoppage, the secondary battery 40 was temporarily fully charged and was then discharged, and the performance of the secondary battery 40 was evaluated after the discharge. This set including one period of charging, stopping the charging, fully charging, discharging, and evaluating the performance was repeated a plurality of times. During the discharge, the surrounding temperature was set to 25° C. and the discharge current was set to 4 C. Here, 4 C means that the secondary battery 40 having a rated capacitance of 36 [Ah] was discharged at a rate of 144 [A] for 0.25 [hours]. Furthermore, the performance evaluation included measuring the discharge capacitance and the battery quality at the time when the terminal voltage of the secondary battery 40 reached 9 [V].

Graph (a) in FIG. 5 shows the discharge capacitance ratio obtained by dividing the discharge capacitance obtained at the performance evaluation of the third set by the discharge capacitance obtained before testing was begun. In a case where the capacitor 42 is connected in parallel with the secondary battery 40 (the left side of Graph (a) in FIG. 5), the discharge capacitance ratio was approximately 0.5. In contrast, when the capacitor 42 was not provided (the right side of Graph (a) in FIG. 5), the discharge capacitance ratio was approximately 0.43. In this way, it was possible to improve the discharge capacitance by approximately 16% (=0.5/0.43) in the "capacitor 42 present" case compared to the "no capacitor 42" case.

Graph (b) in FIG. 5 shows the battery mass ratio obtained by dividing the battery quality obtained at the performance evaluation of the third set by the battery quality obtained before testing was begun. In a case where the capacitor 42 is connected in parallel with the secondary battery 40 (the left side of Graph (b) in FIG. 5), the battery mass ratio was approximately 0.993. In contrast, when the capacitor 42 was not provided (the right side of Graph (b) in FIG. 5), the battery mass ratio was approximately 0.989. In this way, it was found that dissolution of the electrolyte solution progresses more slowly in the "capacitor 42 present" case compared to the "no capacitor 42" case.

Figure 6:
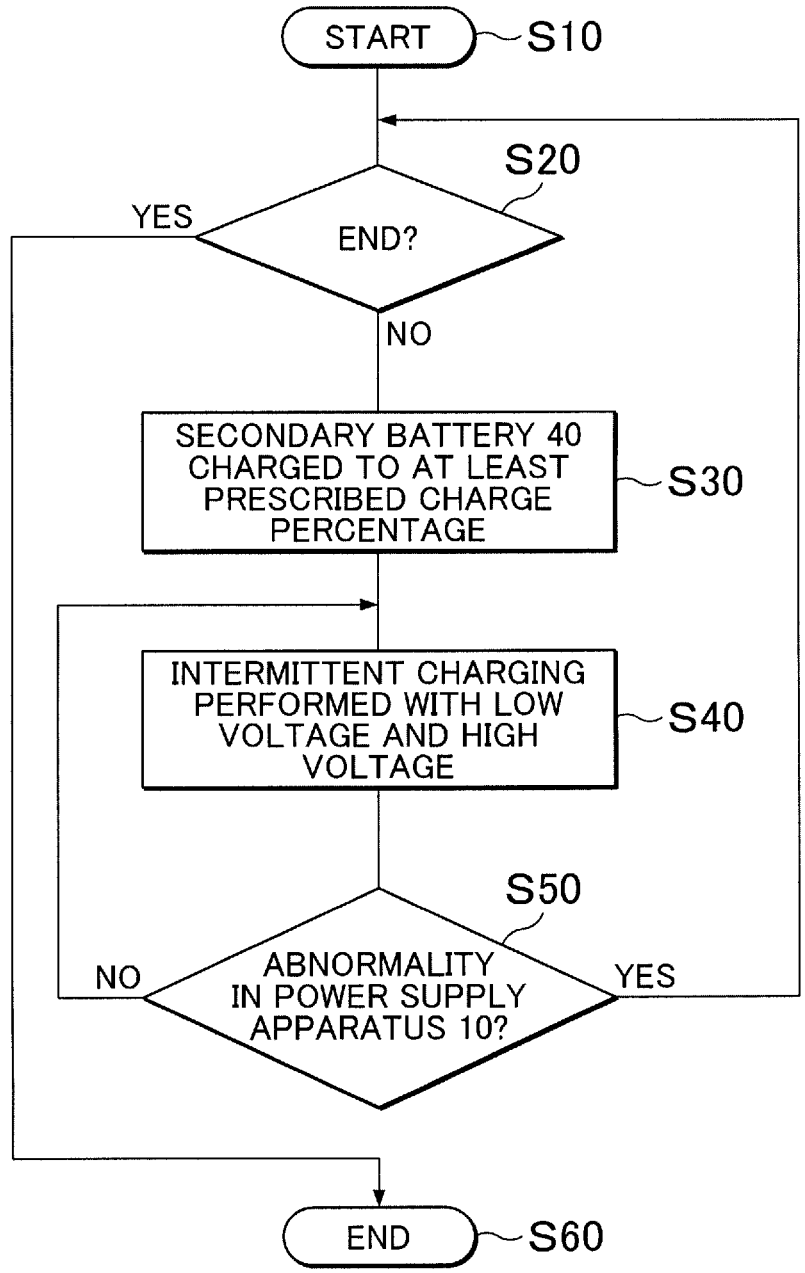
FIG. 6 is a flow chart for describing the charging and discharging control method.

FIG. 6 is a flow chart for describing the charging and discharging control method. The charge/discharge control apparatus 30 may be the component that controls the flow of this example. In order to achieve this, the charge/discharge control apparatus 30 may include a CPU or an ASIC, a memory, and the like necessary to perform control. When charging the secondary battery 40, first, the charge/discharge control apparatus 30 uses the power from the power supply apparatus 10 to charge the secondary battery 40 with a prescribed charge percentage (S30). The prescribed charge percentage may be changed according to the type of the secondary battery 40. In a case where the secondary battery 40 is a lead battery, the prescribed charge percentage may be greater than or equal to 80% and less than or equal to 100% of the fully charged state.

After the secondary battery 40 has been charged to the prescribed charge percentage, the secondary battery 40 is charged according to the intermittent charging described above (S40). During the intermittent charging, the low voltage and the high voltage are repeatedly used in an alternating manner. In this way, during the high voltage charging time $T_H$, it is possible to compensate for the power lost through self discharge during the low voltage charging time $T_L$. The effect of the intermittent charging of the secondary battery 40 is as described above.

The charge/discharge control apparatus 30 may repeat one period, which is made up of $T_L$ and $T_H$, a plurality of times during the intermittent charging (S40). The intermittent charging may continue until an abnormality occurs that cuts off the supply of power from the power supply apparatus 10. If no abnormalities occur in the power supply apparatus 10 (NO at S50), the charge/discharge control apparatus 30 may further continue the intermittent charging (S40).

On the other hand, when an abnormality occurs, the supply of power from the power supply apparatus 10 is cut off. In this case, the load 50 is supplied with power from the secondary battery 40 instead of from the power supply apparatus 10. In this way, the electromotive force of the secondary battery 40 is reduced. When an abnormality occurs in the power supply apparatus 10 (YES at S50), the process returns to the flow between S10 and S20. If no further charging is to be performed (YES at S20), the charging may be ended (S60). On the other hand, if further charging is to be performed (NO at S20), the process moves to S30 and the secondary battery 40 is again charged to the prescribed charge percentage.

The above description is merely one example of the charging and discharging control performed by the charge/discharge control apparatus 30. As long as the order of steps from S30 to S40 is maintained, other steps may be reordered as desired or omitted.

Figure 7:
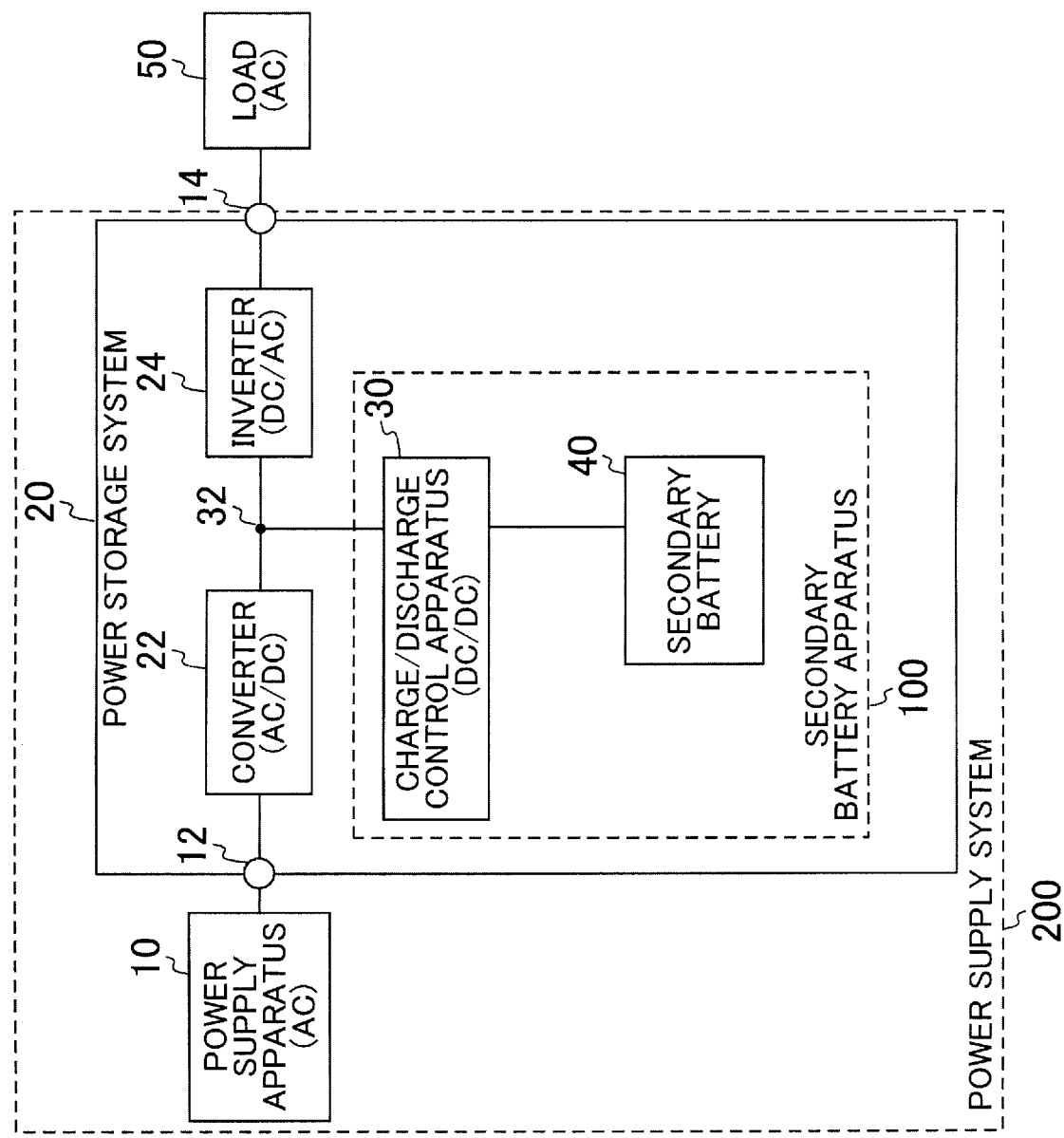
FIG. 7 shows a power supply system 200 according to a second embodiment.

FIG. 7 shows a power supply system 200 according to a second embodiment. The secondary battery apparatus 100 in this example does not include the capacitor 42. The second embodiment differs from the first embodiment with respect to this point. Other points in the second embodiment may be the same as in the first embodiment. In this example, the secondary battery 40 is intermittently charged in the same manner as in the first embodiment.

Figure 8:
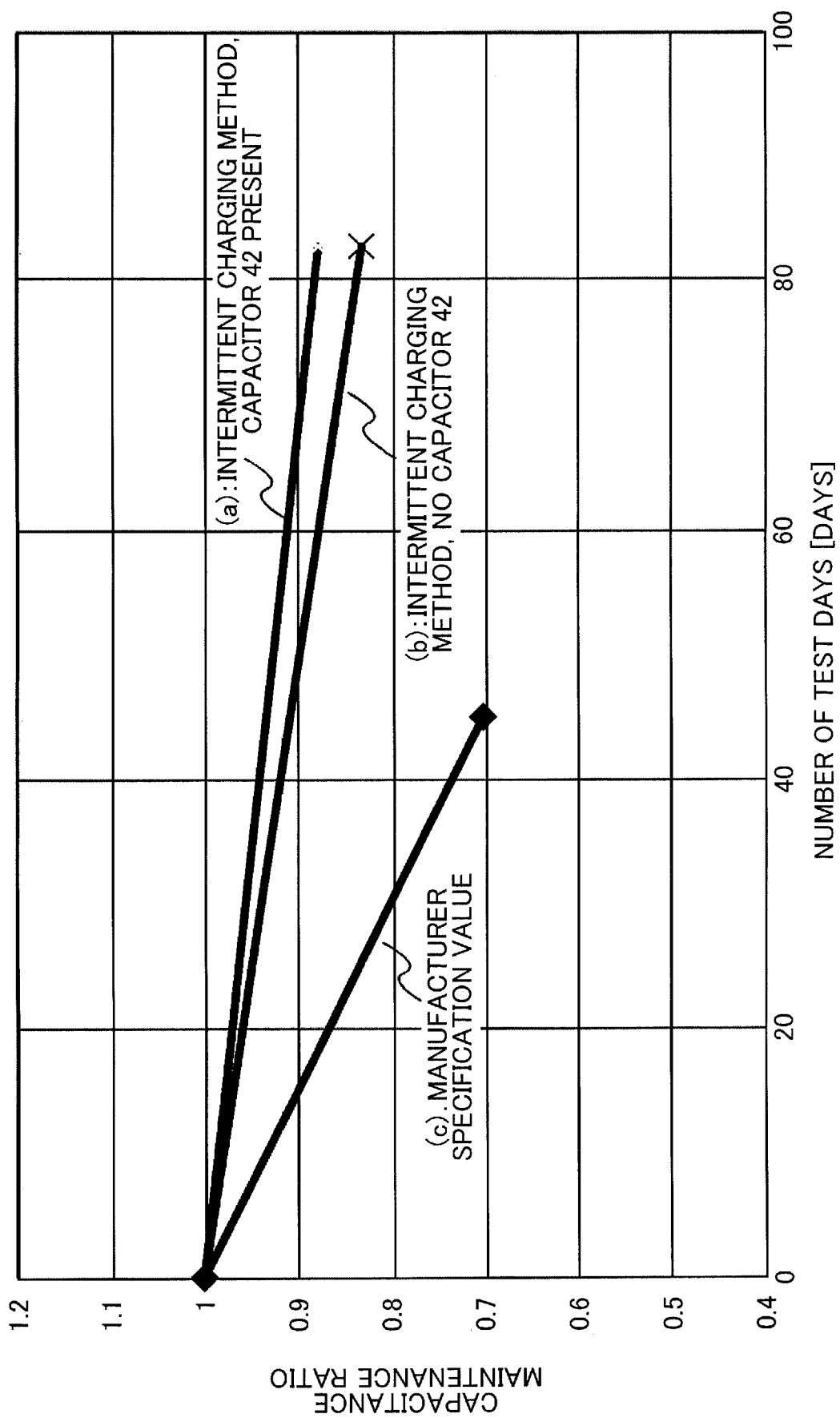
FIG. 8 shows the capacitance maintenance ratio relative to the number of days of testing.

FIG. 8 shows the capacitance maintenance ratio relative to the number of days of testing. The vertical axis indicates the capacitance maintenance ratio, and the horizontal axis indicates the number of days of testing [days]. In this example, the capacitance maintenance ratio is a value obtained by dividing the capacitance after a prescribed number of testing days have passed by the capacitance before testing was begun. Furthermore, the unit for the capacitance in this example is [Ah].

Graphs (a) and (b) each show the capacitance maintenance ratio in a case where the intermittent charging method is adopted. Case (a) shows the capacitance maintenance ratio of the first embodiment including the capacitor 42. In contrast to this, case (b) shows the capacitance maintenance ratio of the second embodiment that does not include the capacitor 42. Case (c) shows the capacitance maintenance ratio as disclosed by the manufacturer, which is a capacitance maintenance ratio of 0.7 after 45 days have passed.

In cases (a) and (b), the full charging, the intermittent charging performed after the full charging for a prescribed time, and the performance evaluation performed after the intermittent charging are performed as one set, and this set was repeated a plurality of times. The prescribed time during which the intermittent charging was performed was set to approximately 28 days. The set described above was performed three times.

At the timing when the three sets have been completed (a timing after approximately 83 days have passed), the capacitance maintenance ratio in case (a) was 0.88 and the capacitance maintenance ratio in case (b) was 0.83. In this way, it was proven that the intermittent charging method is extremely effective for maintaining the capacitance, i.e. the battery life, of the secondary battery 40. In addition, even in case (b) where the capacitor 42 is not connected in parallel with the secondary battery 40, the intermittent charging method was proven to be effective for maintaining capacitance. Of course, case (a) where the capacitor 42 and the secondary battery 40 are connected in parallel and intermittent charging is performed is even more effective.

Figure 9:
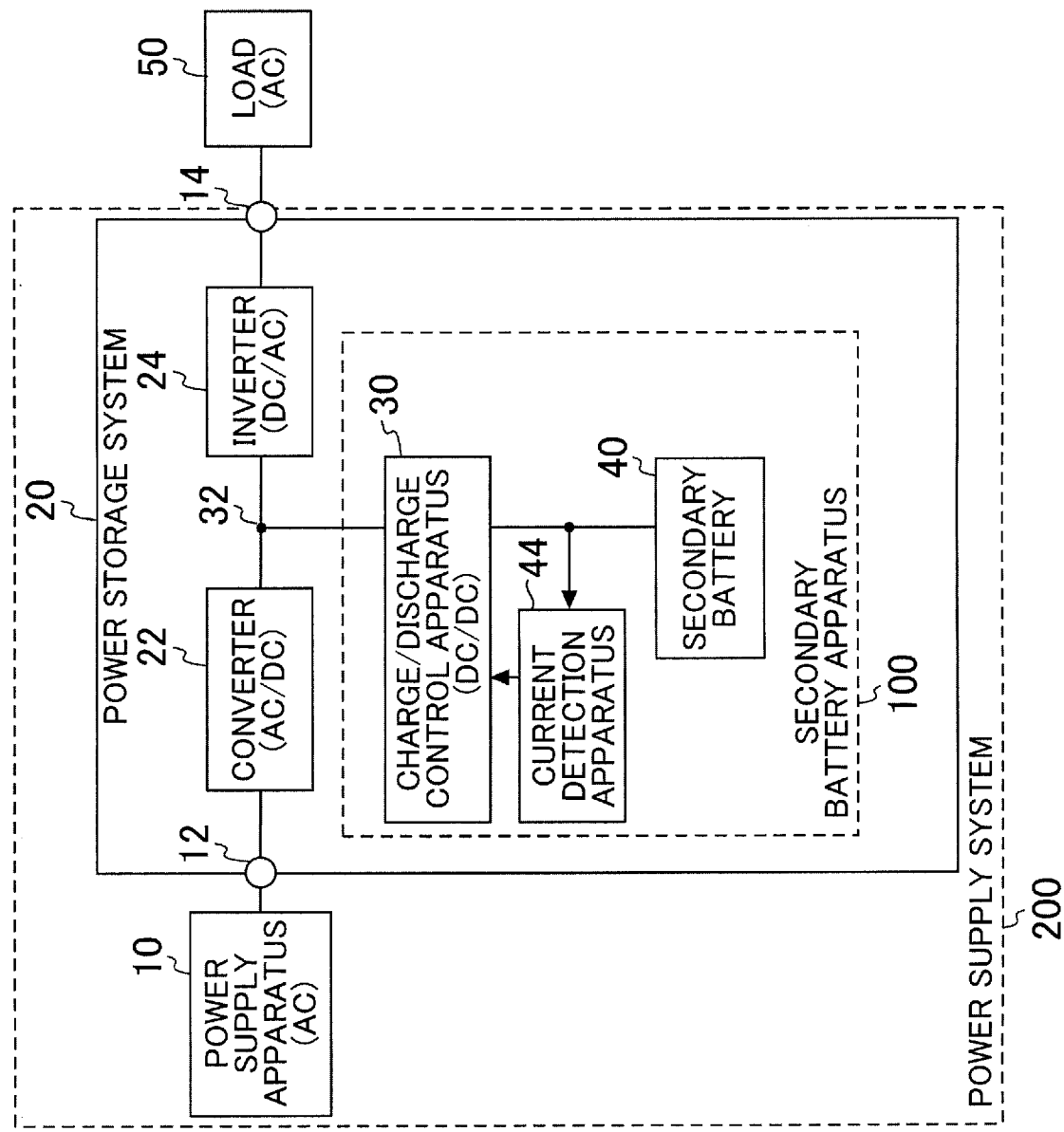
FIG. 9 shows a power supply system 200 according to a third embodiment.

FIG. 9 shows a power supply system 200 according to a third embodiment. The third embodiment differs from the second embodiment by using a current detection apparatus 44. The power storage system 20 in this example includes the current detection apparatus 44 that detects the charging current supplied to the secondary battery 40. The current detection apparatus 44 may be any type of current sensor that that is a direct current sensor. For example, the direct current sensor is a current sensor that measures the current without contacting any wires by using a core, a winding, and a Hall element. The direct current sensor may be a current sensor that uses resistance. The current detection apparatus 44 does not need to be separate from the charge/discharge control apparatus 30, and may be provided integrally with the charge/discharge control apparatus 30.

There are cases where deterioration of the secondary battery 40 reduces the electromotive force when the secondary battery 40 is in a stable state. When the electromotive force is reduced while in the stable state, the initial voltage value for the low voltage is a relatively high voltage value. In this case, when performing the intermittent charging described above, the voltage value for the low voltage is preferably reduced in accordance with the reduced electromotive force.

The current detection apparatus 44 in this example detects the current flowing into the secondary battery 40 and/or the current flowing out from the secondary battery 40. The current detection apparatus 44 in this example notifies the charge/discharge control apparatus 30 concerning the detected current value. The charge/discharge control apparatus 30 controls the voltage value for the low voltage charging in the intermittent charging such that the charging current becomes greater than or equal to zero [A] during the low voltage charging. Specifically, the charge/discharge control apparatus 30 may control the voltage value for the low voltage such that the charging current becomes zero [A] after 240 [sec] from the start of $T_L$, in the same manner as in the example of FIG. 3. The charge/discharge control apparatus 30 may set the voltage value for the low voltage to be in a range of less than or equal to 12.6 V (2.1 V per cell) and greater than or equal to 9.36 V (1.95 V per cell).

In this example, the charging current used for the low voltage charging may refer to the discharge current caused by the self discharge and the current supplied from at least one of the power supply apparatus 10 and the capacitor 42. Furthermore, the value of zero [A] may refer to a value of substantially zero [A]. Specifically, a value of substantially zero [A] may refer to a value less than or equal to 0.02 [A] or less than or equal to 0.0004 C. The present example may be combined with the first embodiment. Specifically, the current detection apparatus 44 may be used while the capacitor 42 is connected in parallel with the secondary battery 40.

Figure 10:
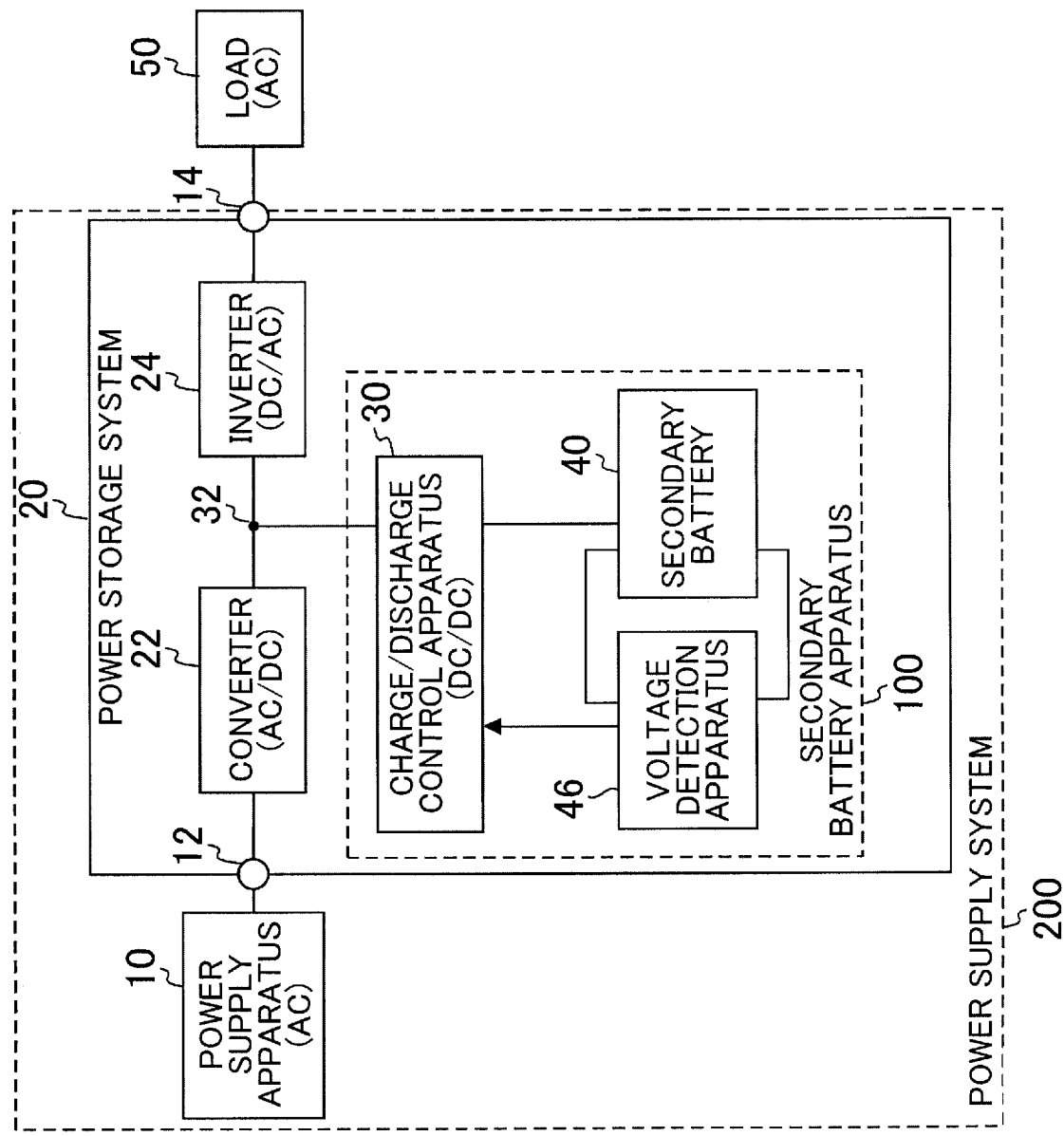
FIG. 10 shows a power supply system 200 according to a fourth embodiment.

FIG. 10 shows a power supply system 200 according to a fourth embodiment. The fourth embodiment differs from the second embodiment by using a voltage detection apparatus 46. The power storage system 20 in this example includes the voltage detection apparatus 46 that detects the electromotive force of the secondary battery 40. The voltage detection apparatus 46 does not need to be separate from the charge/discharge control apparatus 30, and may be provided integrally with the charge/discharge control apparatus 30.

The voltage detection apparatus 46 in this example notifies the charge/discharge control apparatus 30 concerning the detected electromotive force of the secondary battery 40. The charge/discharge control apparatus 30 controls the voltage value for the low voltage based on the electromotive force detected by the voltage detection apparatus 46. Specifically, when the electromotive force of the secondary battery 40 is reduced, the charge/discharge control apparatus 30 may determine the voltage value for the low voltage to be in a range of less than or equal to 12.6 V (2.1 V per cell) and greater than or equal to 9.36 V (1.95 V per cell). In this way, it is possible to lower the voltage value for the low voltage used for the intermittent charging, in accordance with the reduced electromotive force. The present example may be combined with the first embodiment. Specifically, the voltage detection apparatus 46 may be used while the capacitor 42 is connected in parallel with the secondary battery 40.

Figure 11:
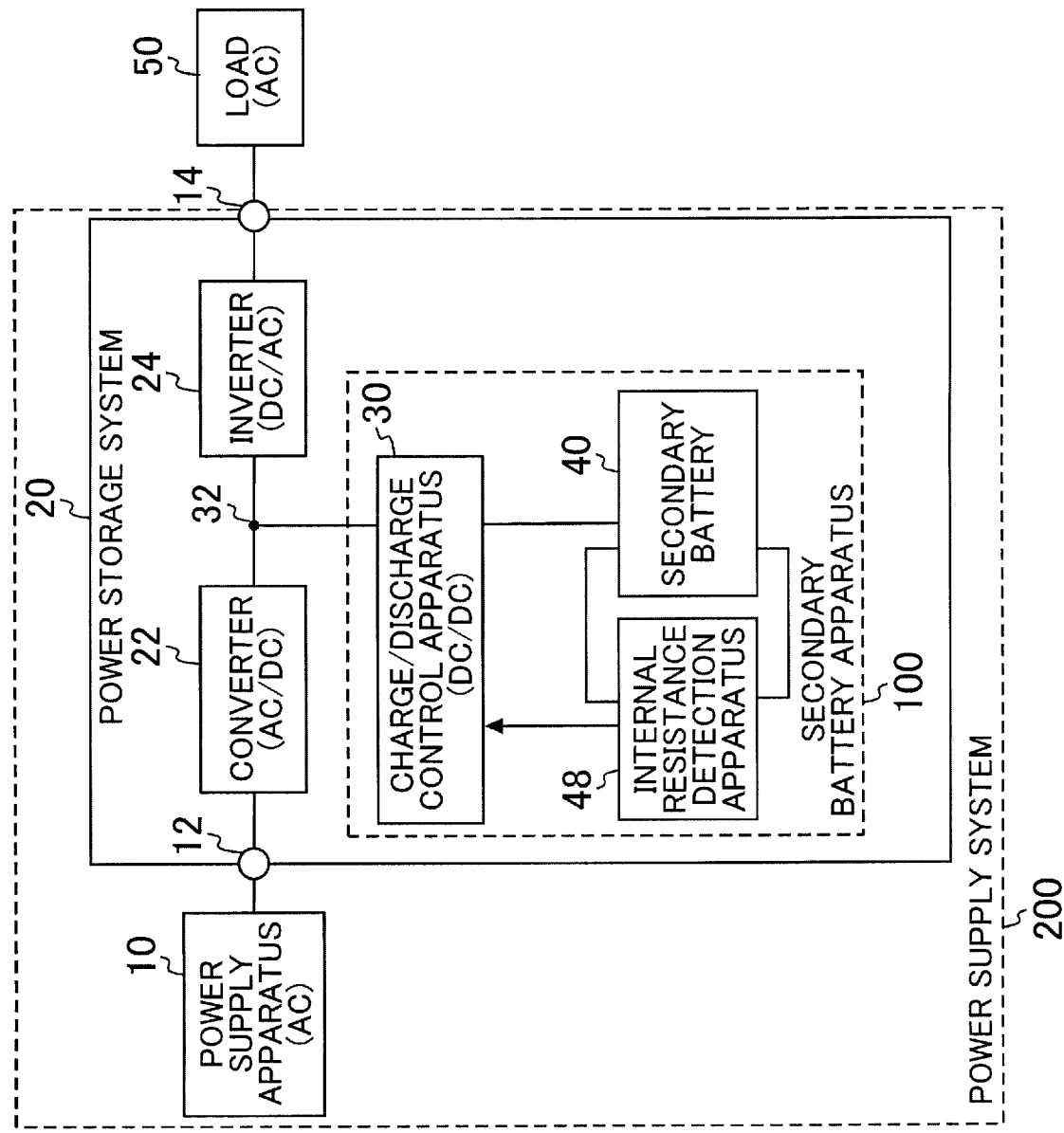
FIG. 11 shows a power supply system 200 according to a fifth embodiment.

FIG. 11 shows a power supply system 200 according to a fifth embodiment. The fifth embodiment differs from the second embodiment by using an internal resistance detection apparatus 48. The power storage system 20 in this example includes the internal resistance detection apparatus 48 that measures the internal resistance of the secondary battery 40. The internal resistance detection apparatus 48 does not need to be separate from the charge/discharge control apparatus 30, and may be provided integrally with the charge/discharge control apparatus 30.

The internal resistance detection apparatus 48 in this example detects the internal resistance of the secondary battery 40 and notifies the charge/discharge control apparatus 30 concerning this internal resistance. The charge/discharge control apparatus 30 controls the high voltage charging time $T_H$ based on the internal resistance of the secondary battery 40. It is known that the internal resistance increases along with usage time. The increase in the internal resistance is caused by the formation of hardened sulfation.

Therefore, when the internal resistance of the secondary battery 40 increases, the charge/discharge control apparatus 30 may make $T_H$ longer than the $T_H$ initially used in the charging cycle, in a manner to turn the sulfation back into lead or lead oxide. Specifically, $T_H$ may be set to be greater than or equal to 10 [sec] and less than or equal to 14400 [sec]. The present example may be combined with the first embodiment. Specifically, the internal resistance detection apparatus 48 may be used while the capacitor 42 is connected in parallel with the secondary battery 40.

As another example, the charge/discharge control apparatus 30 may control $T_H$ based on the usage time of the secondary battery 40. Since the sulfation becomes hardened as the usage time of the secondary battery 40 increases, the charge/discharge control apparatus 30 may set $T_H$ to be longer than the $T_H$ initially used in the charging cycle. The present example may be combined with the first embodiment.

As another example, the charge/discharge control apparatus 30 may control $T_L$ based on the usage time of the secondary battery 40. The deterioration of the positive pole and the loss of the electrolytic solution both progress as the usage time of the secondary battery 40 becomes longer. Therefore, in order to prevent further worsening of these problems, $T_L$ may be set to be longer than the $T_L$ initially used in the charging cycle. Specifically, $T_L$ may be set to be greater than or equal to 60 [sec] and less than or equal to 86400 [sec]. Furthermore, $T_H$ may be shortened in response to $T_L$ being lengthened. Specifically, the amount of the increase in $T_L$ may be equal to the amount of the decrease in $T_H$. The present example may be combined with the first embodiment. The charge/discharge control apparatus 30 may control the low voltage charging time $T_L$ based on the internal resistance of the secondary battery 40. When the internal resistance increases, in order to prevent further worsening of the internal resistance, $T_L$ may be set to be longer than the $T_L$ used in the initial charging cycle. Specifically, $T_L$ may be set to be greater than or equal to 60 [sec] and less than or equal to 86400 [sec].

Figure 12:
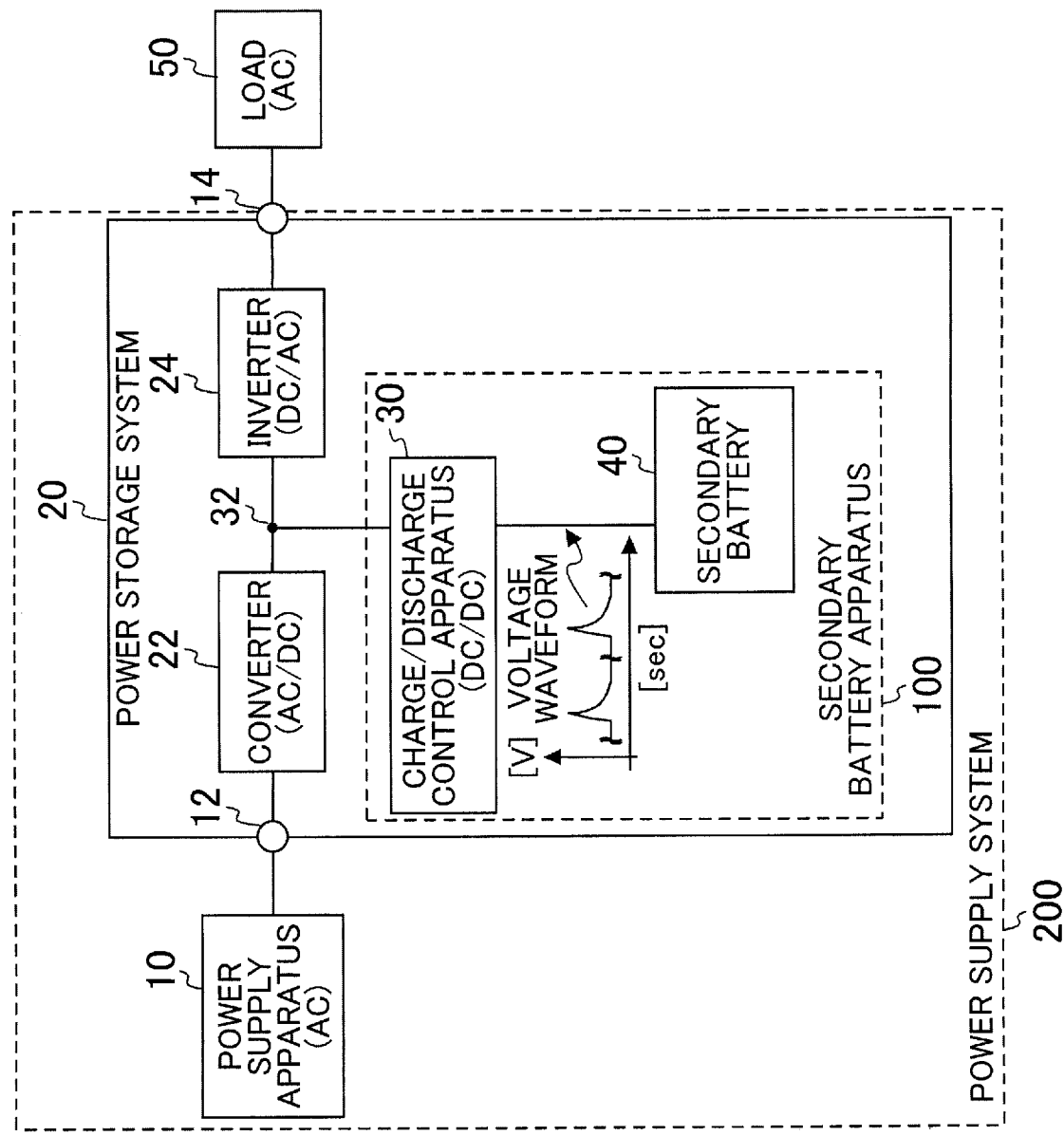
FIG. 12 shows a power supply system 200 according to a sixth embodiment.

FIG. 12 shows a power supply system 200 according to a sixth embodiment. The charge/discharge control apparatus 30 in this example does not include the capacitor 42, but outputs a voltage waveform that is similar to the voltage waveform realized when the capacitor 42 is included to the secondary battery 40. In order to realize this, the charge/discharge control apparatus 30 may contain a memory in which the voltage waveform is recorded in advance. The present embodiment differs from the second embodiment with respect to this point.

The charge/discharge control apparatus 30 in this example applies a pulsed high voltage obtained by removing a predetermined high frequency component from a square wave to the secondary battery 40, when performing the high voltage charging in the intermittent charging. The pulsed waveform obtained by removing a predetermined high frequency component from a square wave refers to a waveform that is not a square wave. As one example, this waveform may be the same as the waveform realized in the "capacitor 42 present" case in FIG. 3 according to the first embodiment. In this way, even when the capacitor 42 is not included, it is possible to realize the effect of lengthening the constant current charging time, in the same manner as in the "capacitor 42 present" case of the first embodiment.

As another example, the pulse obtained by removing a predetermined high frequency component from a square wave may be a waveform obtained by removing one or more harmonics including the highest frequency components among combinations of a prescribed frequency and an n-th harmonic of this prescribed frequency, where n is a natural number. In other words, even when the capacitor 42 is not included, the voltage value may have a waveform that rises gradually and falls gradually during $T_H$, in the same manner as when the capacitor 42 is included. Therefore, even when the capacitor 42 is not included, the same effect is realized as in the "capacitor 42 present" case of the first embodiment.

The present example may be combined with any one of the third to fifth embodiments. In other words, the present example may be combined with an example for controlling the low voltage value.

FIG. 13 shows a graph (a) of a pulse waveform including a high frequency component and a low frequency component. FIG. 13 also shows a graph (b) of a pulse waveform obtained by removing the high frequency component. Normally, a square wave is formed by combining a high frequency component and a low frequency component. The waveform shown in the graph (a) is not a perfect square wave, but can be viewed as a square wave. As shown in the graph (a), the regions near the rising edge and the falling edge of the waveform are formed by high frequency components. Therefore, when the high frequency component is removed, the edge portions in the square wave are removed.

In the example shown in the graph (b), the high frequency component forming the edges has been removed. In the example shown in the graph (b), the pulse time may include the entire time of $T_H$ and a partial time of $T_L$ immediately following $T_H$. The pulse time may be 300 [sec] (60 [sec]+ 240 [sec]), in the same manner as in the example of FIG. 3. In the example shown in the graph (b), the rising time of the voltage waveform in the pulse time may be adjusted as desired. In this example, the rising time of the voltage waveform refers to the time from when the voltage value becomes greater than the low voltage to when the voltage value reaches a maximum value. Furthermore, the rising time of the voltage waveform may be greater than or equal to half of the high voltage application time. In this example, the high voltage application time refers to the time from when the voltage value becomes greater than the low voltage to when the voltage value begins dropping to the low voltage.

In the example shown in the graph (b), the voltage value rises gradually and drops gradually. Therefore, with the example shown in the graph (b), it is possible to realize the same effect as the example of the "capacitor 42 present" case shown in FIG. 3.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: power supply apparatus, 12: input terminal, 14: output terminal, 20: power storage system, 22: converter, 24: inverter, 30: charge/discharge control apparatus, 32: node, 34: node, 40: secondary battery, 42: capacitor, 44: current detection apparatus, 46: voltage detection apparatus, 48: internal resistance detection apparatus, 50: load, 100: secondary battery apparatus, 200: power supply system

What is claimed is:

1. A charge/discharge control apparatus that controls charging and discharging of a lead battery, wherein
   the charge/discharge control apparatus is adapted to repeatedly perform, for an entire time while the lead battery voltage exceeds a prescribed charge percentage of at least 80% of a fully charged state, in an alternating manner for a plurality of times;
   a first voltage level charging of applying a pulsed positive voltage at a first voltage level to the lead battery, the first voltage level being formed by a square wave with a predetermined high frequency component removed to emulate a capacitor filter; and
   a second voltage level charging of applying a positive voltage at a second voltage level higher than 0v and lower than the first voltage level, the second voltage level being greater than or equal to an electromotive force when the lead battery is fully discharged,
   the first voltage level and the second voltage level being based on an electromotive force of the lead battery;
   wherein the charge/discharge control apparatus is further adapted to detect a charging current supplied to the lead battery and controls a voltage value of the positive voltage at the second voltage level such that the charging current is greater than or equal to zero during the entire duration of the second voltage level charging time.

2. A charging/discharging control method for controlling charging and discharging of a lead battery, the method comprising:
   repeatedly performing, for an entire time while the lead battery voltage exceeds a prescribed charge percentage of at least 80 of a fully charged state, in an alternating manner for a plurality of times;
   a first voltage level charging of applying a pulsed positive voltage at a first voltage level to the lead battery, the first voltage level being formed by a square wave with a predetermined high frequency component removed to emulate a capacitor filter; and
   a second voltage level charging of applying a positive voltage at a second voltage level higher than 0v and lower than the first voltage level, the second voltage level being greater than or equal to an electromotive force of the lead battery when the lead battery is fully discharged,
the first voltage level being based on the electromotive force of the lead battery;
wherein a voltage value of the positive voltage at the second voltage level is detected and controlled such that the charging current is greater than or equal to zero during the entire duration of the second voltage level charging time.

3. An intermittent battery charging apparatus comprising:
a lead battery; and
a charge/discharge control apparatus that controls charging and discharging of the lead battery, wherein
the charge/discharge control apparatus is adapted to repeatedly perform, for an entire time while the lead battery voltage exceeds a prescribed charge percentage of at least 80% of a fully charged state, in an alternating manner for a plurality of times:
a first voltage level charging of applying a pulsed positive voltage at a first voltage level to the lead battery, the first voltage level being formed by a square wave with a predetermined high frequency component removed to emulate a capacitor filter; and
a second voltage level charging of applying a positive voltage at a second voltage level higher than 0v and lower than the first voltage level, the second voltage level being greater than or equal to an electromotive force of the lead battery when the lead battery is fully discharged,
the first voltage level and the second voltage level being based on the electromotive force of the lead battery;
wherein the charge/discharge control apparatus is further adapted to detect a charging current supplied to the lead battery and controls a voltage value of the positive voltage at the second voltage level such that the charging current is greater than or equal to zero during the entire duration of the second voltage level charging time.

4. The intermittent battery charging apparatus according to claim 3, wherein
the charge/discharge control apparatus is adapted to repeatedly perform, for a plurality of times, the first voltage level charging and the second voltage level charging in an alternating manner, until a supply of power from a power supply apparatus to the lead battery is cut off.

5. The intermittent battery charging apparatus according to claim 3, wherein
the positive voltage of the second voltage level is less than or equal to an electromotive force of the lead battery when fully charged.

6. The intermittent battery charging apparatus according to claim 3, wherein
the positive voltage of the second voltage level is less than or equal to 121% of a voltage value of a theoretical electromotive force of the lead battery.

7. The intermittent battery charging apparatus according to claim 3, wherein
a second voltage level charging time $T_L$ during which the positive voltage at the second voltage level is applied to the lead battery is longer than a first voltage level charging time $T_H$ during which the positive voltage at the first voltage level is applied to the lead battery.

8. The intermittent battery charging apparatus according to claim 7, wherein
the second voltage level charging time $T_L$ is greater than or equal to a time from when the second voltage level charging time $T_L$ begins to when the positive voltage at the second voltage level is reached.

9. The intermittent battery charging apparatus according to claim 7, wherein
a ratio between the second voltage level charging time $T_L$ and the first voltage level charging time $T_H$ is such that $4 \leq T_L/T_H$.

10. The intermittent battery charging apparatus according to claim 3, wherein
the charge/discharge control apparatus is further adapted to detect a current electromotive force of the lead battery and controls a voltage value of the positive voltage at the second voltage level, based on the detected current electromotive force.

11. The intermittent battery charging apparatus according to claim 3, wherein
the charge/discharge control apparatus is further adapted to control a high voltage charging time TH during which the positive voltage at the first voltage level is applied to the lead battery, based on a usage time of the lead battery.

12. The intermittent battery charging apparatus according to claim 3, wherein
the charge/discharge control apparatus is further adapted to control a first voltage level charging time TH during which the positive voltage at the first voltage level is applied to the lead battery, based on an internal resistance of the lead battery.

13. The intermittent battery charging apparatus according to claim 3, wherein
the charge/discharge control apparatus is further adapted to control a second voltage level charging time TL during which the positive voltage at the second voltage level is applied to the lead battery, based on a usage time of the lead battery.

14. The intermittent battery charging apparatus according to claim 3, wherein
the charge/discharge control apparatus is further adapted to control a second voltage level charging time TL during which the positive voltage at the second voltage level is applied to the lead battery, based on an internal resistance of the lead battery.

15. The intermittent battery charging apparatus according to claim 3, further comprising:
a capacitor element that is connected in parallel with the lead battery and has an electrostatic capacitance.

16. An uninterruptable power supply that includes the intermittent battery charging apparatus according to claim 3.

17. A power supply system comprising:
a power supply apparatus; and
the intermittent battery charging apparatus according to claim 3, wherein
the charge/discharge control apparatus of the intermittent battery charging apparatus charges the lead battery with power generated by the power supply apparatus.

18. The intermittent battery charging apparatus according to claim 3, wherein
the charge/discharge control apparatus comprises no capacitor placed across the lead battery.

* * * * *